MAGNETIC PRINTER

Filed June 3, 1955 4 Sheets-Sheet 1

INVENTOR.
JOHN C. SIMS, JR.
BY
Charles C. English
AGENT

INVENTOR.
JOHN C. SIMS, JR.
BY
Charles C. English
AGENT

Nov. 8, 1960 J. C. SIMS, JR 2,959,638
MAGNETIC PRINTER
Filed June 3, 1955 4 Sheets-Sheet 3
FIG. 3A.
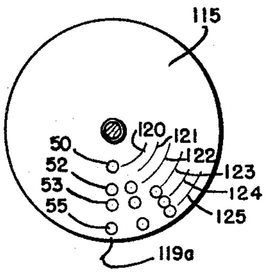
FIG. 3B.
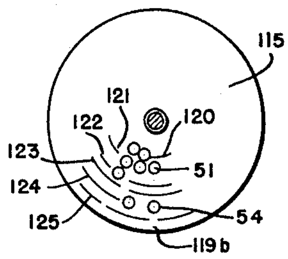
FIG. 13.
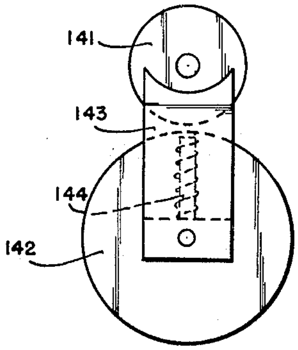
FIG. 14.
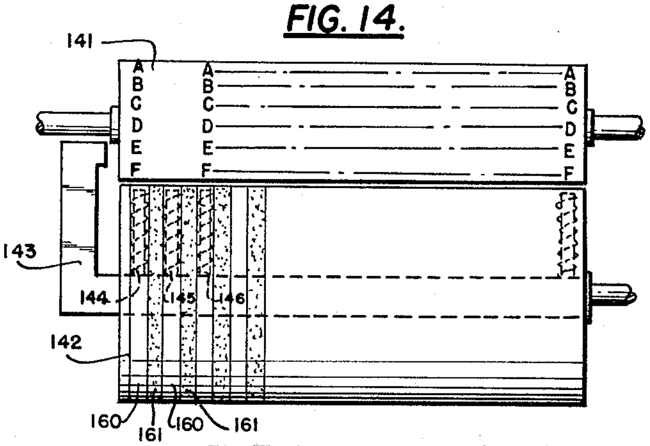
FIG. 15.
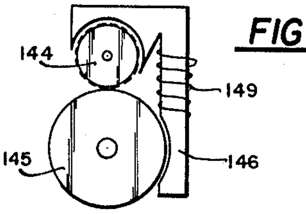
FIG. 16.
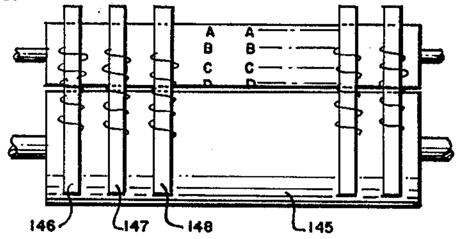
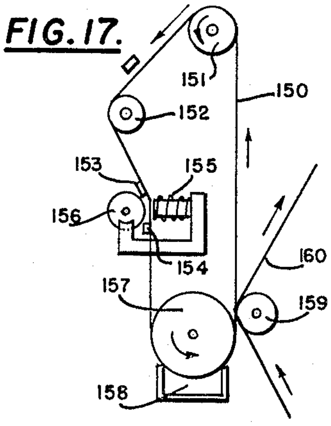
FIG. 18.
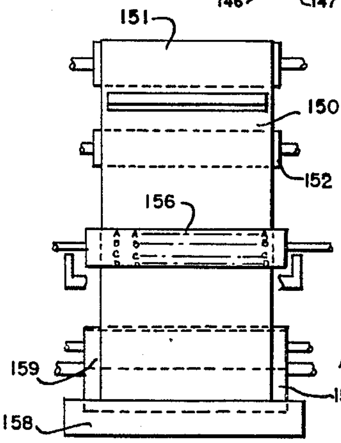
INVENTOR.
JOHN C. SIMS, JR.
BY Charles C. English
AGENT

MAGNETIC PRINTER

Filed June 3, 1955 4 Sheets-Sheet 4

INVENTOR.
JOHN C. SIMS, JR.
BY
Charles C. English
AGENT 2,959,638
Patented Nov. 8, 1960

1

2,959,638

MAGNETIC PRINTER

John C. Sims, Jr., Springhouse, Pa., assignor to Sperry Rand Corporation, New York, N.Y., a corporation of Delaware Filed June 3, 1955, Ser. No. 513,131
24 Claims. (Cl. 178—23)

This invention relates to printing devices and more particularly to so-called magnetic printers.

The primary object of the invention is to provide a magnetic printer which is continuous in its operation, that is the apparatus proceeds continuously from the point of magnetizing the tape or other magnetic medium until the information is printed on the paper.

Another object of the invention is to provide a magnetic printer which is automatic in its operation.

Still another object of the invention is to provide a device which will take information from a magnetic or punched paper tape, magnetize a drum or other magnetic medium according to such information, and then perform a printing operation in accordance with the recorded magnetic configurations.

Still another object of the invention is to provide comparison means particularly adapted for use with magnetic printers which will compare binary signals produced by a tape or other recording means with the position of a rotating typewheel carrying magnetic elements and control the energization of the typewheel to energize it at the proper time.

An additional object of the invention is to provide means for reducing the effect of magnetic leakage in a magnetic printer.

It is another object of the invention to so arrange the magnetic printing heads that flux through through one does not, by leakage, affect any of the others.

Still another object of the invention is to provide magnetic printing means whereby the configuration of the letter to be printed may be impressed by one operation on the magnetic recording means.

Still another object of the invention is to provide an improved form of raised magnetic element for magnetizing the recording medium.

Other objects of the invention will appear as this description proceeds.

Briefly speaking, the invention employs an endless recording medium on which is imprinted the characters to be printed. Preferably, these characters are in the form of raised letters of magnetic material mounted on a rotating typewheel and they move in very close proximity to the magnetic recording medium. When any given character is in its closest relation with the recording medium, it may have flux passed therethrough if it is desired to record that character on the medium. Heretofore, it has been the practice to build up each letter on

2 the recording medium by separately magnetizing a number of small dots which, when taken together, form the configuration of the desired letter. However, the present invention contemplates that the magnetic configuration itself is imprinted on the rotating typewheel and that the recording medium is directly magnetized by the proper character in one operation. An improvement feature of the invention also resides in forming these magnetic characters of ridges or sharp lines of magnetic material so as to concentrate the flux on the recording medium. After the magnetic characters have been imprinted on the endless recording medium, the latter is stepped forward line by line and passes next through a dusting box which contains fine powdered material adapted to cling to the magnetized areas of the drum. As a result, when a given character has been imprinted on the endless recording medium, and the medium has passed through the dusting box, dust particles will adhere to the drum and will bear the same shape or character that was printed on the drum. The endless recording medium then passes to the printing means which is generally a roller which presses the paper on which printing is to take place firmly against the endless recording medium so as to transfer the clinging dust particles to the paper. Later the endless recording medium passes by an erasing magnet where all of the magnetism is removed. Following this, the endless recording medium passes to the rotating typewheel and the process is ready to be repeated.

The information to be printed may be stored on a magnetic tape or by punched holes in paper tape. This tape is stepped forward in synchronism with the rotation of the typewheel as well as with the recording medium, although the recording medium normally operates at a much slower rate than the rotating typewheel. The magnetic or paper tape produces coded signals which are compared from instant to instant with the angular position of the rotating typewheel by a comparator. Two signals are fed to the comparator. One signal is the coded signal from the paper or magnetic tape and designates which character is to be printed. Another signal is generated and changes from instant to instant as the typewheel rotates. It produces coded signals complementary to the character which is in printing position. When coincidence is obtained between the two sets of binary signals, an electromagnet is energized and passes magnetic flux through the character which is in printing position and thus magnetizes the endless recording medium.

The invention also teaches various details of the aforesaid mechanism as well as numerous arrangements of the endless tape, the electromagnets, the flux path, etc.

In the drawings:

Figure 3A is a view of one side of a comparator disc of Figure 3.

Figure 3B is a view of the other side of the comparator disc shown in Figure 3A.

Figure 13 is an end view of a modified form of the rotating typewheel and recording medium.

Figure 14 is a front view of Figure 13.

Figure 15 is an end view of a modified form of the rotating typewheel and recording medium.

Figure 16 is a side view of Figure 15.

Figure 17 is a side view of a modified form of the rotating typewheel, the electromagnets, the dusting member and the printing roller, etc.

Figure 18 is a front view of the device of Figure 17.

Background information helpful in understanding the present disclosure may be found in the following:

(1) The copending application of John Presper Eckert, Jr. and J. C. Sims, Jr., Serial No. 221,362, filed April 17, 1951, for: "Method and Apparatus for Magnetic Printing";

(2) The copending application of John Presper Eckert, Jr. and John C. Sims, Jr., Serial No. 333,574, filed January 27, 1953, for: "High Speed Printer";

(3) The copending application of John C. Sims, Jr., Serial No. 505,710, filed May 3, 1955, for: "Dry Powder Ink Applicators";

(4) An article on "Ferrography," by Atkinson and Ellis, Franklin Institute Journal of November 1951;

(5) An article on "Ferromagnetography," by T. M. Berry and J. O. Hanna, appearing in the General Electric Review of July 1952;

(6) An article entitled: "A Survey of Non-Mechanical Type Printers," by R. J. Rossheim—ACM Conference, December 12, 1952;

(7) An article entitled: "Magnetic Reproducer and Printer," by J. C. Sims, Jr.—ACM Western Computer Conference of February 1953.

Figures 1, 2:
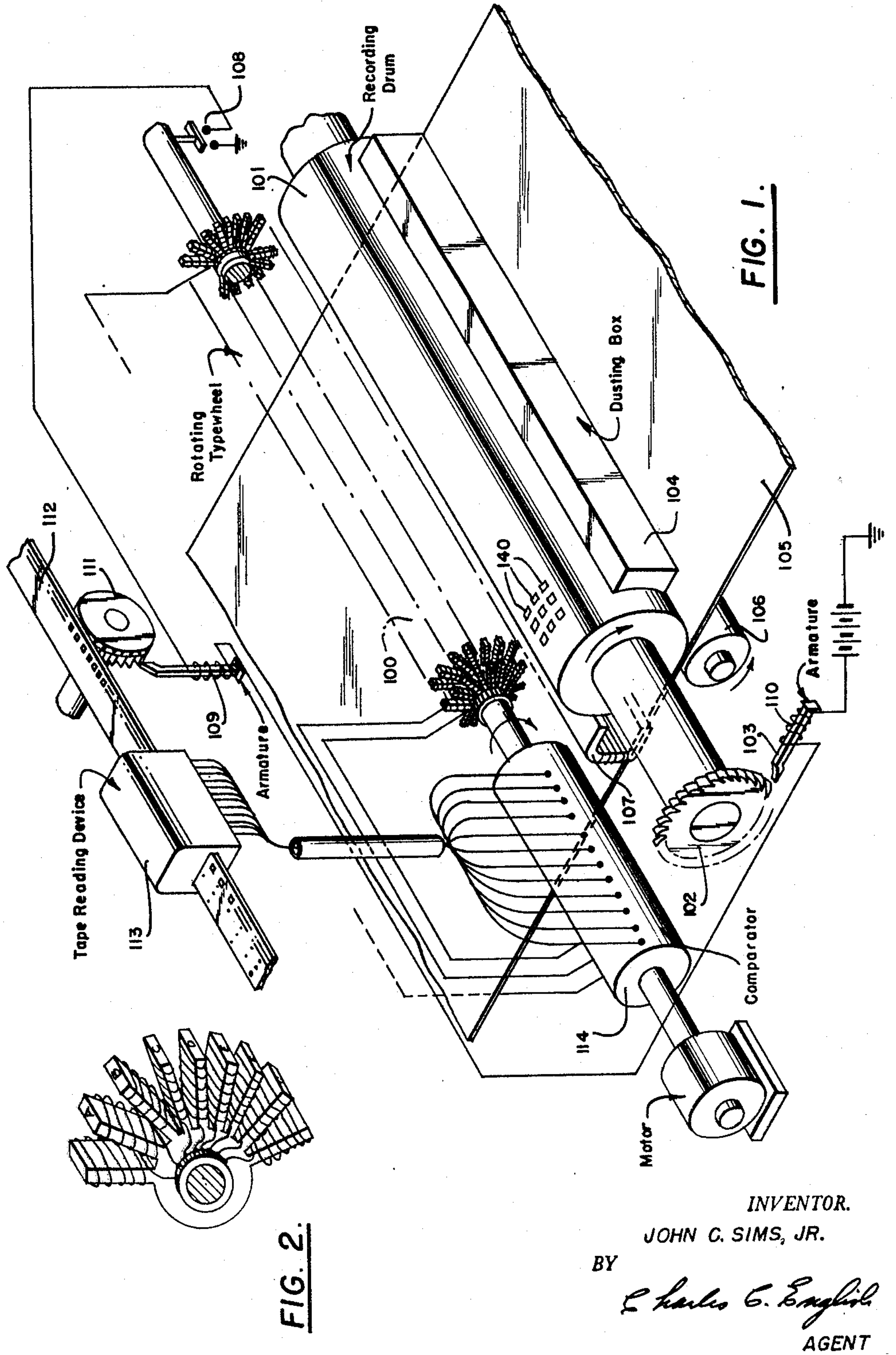
Figure 1 is a perspective view of one form of the invention.
Figure 2 is a detailed view of one section of the rotating typewheel.
Figures 4, 6:
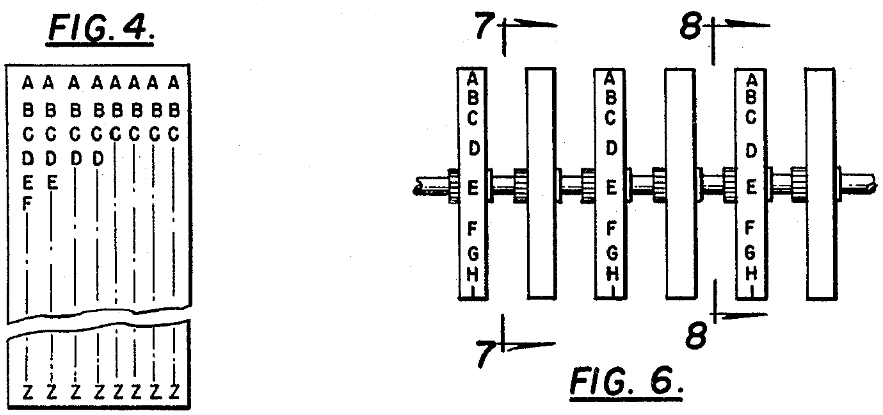
Figure 4 is a developed view of one form which the typewheel may take.
Figure 6 is a detailed view showing part of the rotating typewheel.
Figures 5, 7, 8, 9, 10, 11, 11A, 12, 12A:
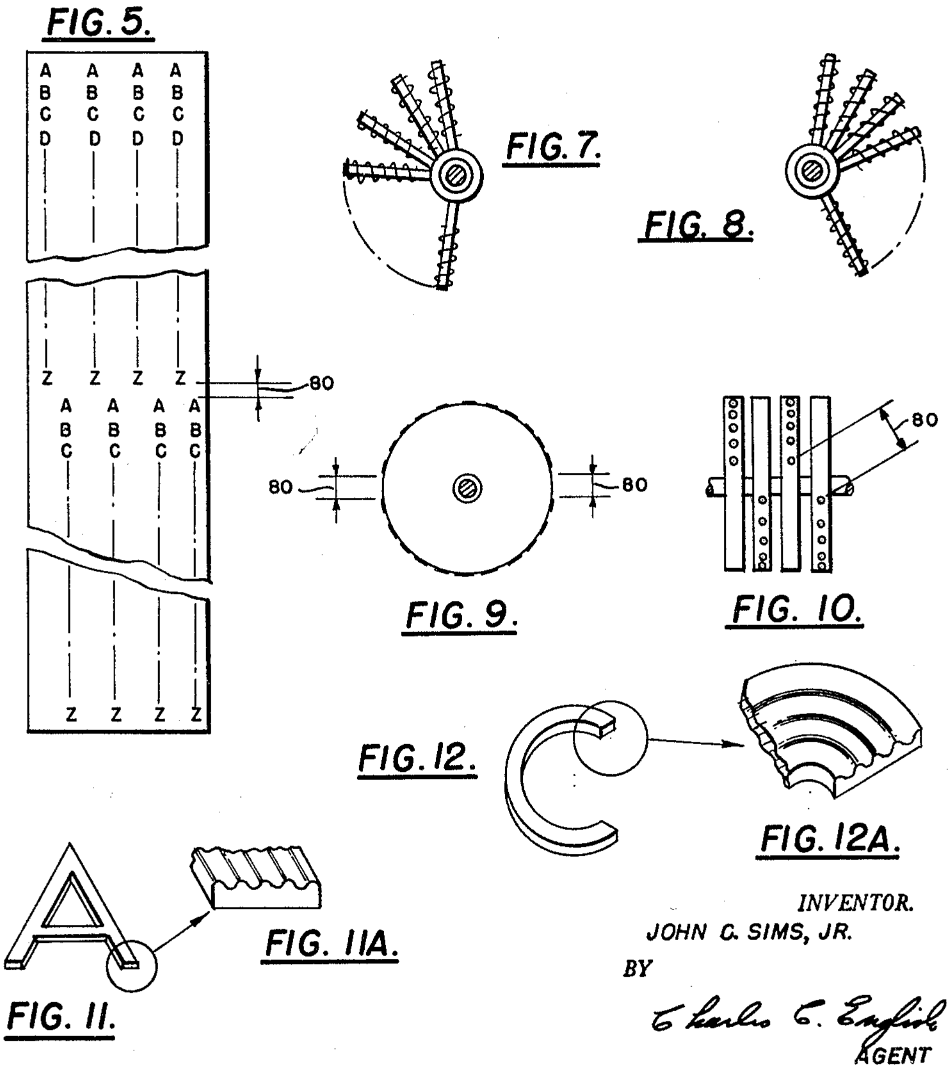
Figure 5 is a developed view of an improved form of the typewheel.
Figure 7 is a detailed view of the rotating typewheel as viewed along lines 7—7 of Figure 6.
Figure 8 is a detailed view of a part of the rotating typewheel as viewed along line 8—8 of Figure 6.
Figure 9 is an end view of the typewheel in which two sections such as those shown in Figures 7 and 8 are combined.
Figure 10 is a view of the typewheel similar to that of Figure 6 except that the typewheel is rotated by 90 degrees.
Figures 11 and 11A illustrate how the raised configuration of the letter "A" would be constructed.
Figures 12 and 12A illustrate how the raised element representing the letter "C" would be built according to the invention.

In Figure 1 a rotating typewheel 100 has a large number of individual recording sections, a typical one of which is illustrated in Figure 2. There is one of these sections for each vertical column in which printing is to take place. Each section of the typewheel has as many electromagnets as there are letters and numbers to be printed. In other words, although there are only nine electromagnets shown in Figure 2, if it were desired to have the entire alphabet available for printing, there would be twenty-six electromagnets employed. These electromagnets are preferably (though not necessarily) located within a 180-degree sector of the typewheel. For example, as shown in Figure 2, the nine electromagnets are completely disposed within a sector of about 160 degrees of the typewheel and if there were twenty-six or even more characters to be printed, there would be twenty-six or more electromagnets all located within the 160-degree sector of the typewheel. Every alternate section of the typewheel utilizes a different 160-degree sector of the typewheel. This is illustrated in Figures 5 to 10 inclusive. Figure 5 is a developed view of the first eight sections of the typewheel. It is noted that the first, third, fifth and seventh sections of the typewheel are located in alternate columns and interposed between the second, fourth, sixth and eighth sections of the typewheel. As shown in Figure 6, the letters or printing characters of the typewheel appear only on the first, third and fifth sections but it is understood that if the typewheel were viewed from the rear, there would be no printing characters on the first, third and fifth sections, but there would be printing characters on the second, fourth, and sixth sections. Figure 7 is an end view of one of the even numbered sections of the typewheel, while Figure 8 is a similar end view of one of the odd numbered sections of the typewheel.

The arrangement of Figures 5 to 10 inclusive will now be compared to another possible arrangement shown in Figure 4. Figure 4 is a developed view of a modified form of typewheel in which the diameter would only be half that of Figures 5 to 10 inclusive. Each section of the typewheel would extend around the complete 360-degrees of the wheel. There would be a row of letters A extending clear across the typewheel and parallel to the axis thereof followed by a row of B's, then C's, etc. This is a feasible arrangement but not as good as the system of Figures 5 to 10 inclusive. The difficulty involved in Figure 4 is that in event it is desired to print the A in the first column and it is energized with magnetic flux as hereinafter explained, there is the possibility of some of that flux passing by leakage to the letter A in the second vertical column and thus printing a letter A dimly in that column. That cannot happen in connection with Figure 5 because adjacent columns are printed by sections which are on different sectors of the typewheel. Hence it is noted that the spacing between the closest two letters A of Figure 5 is much greater than between two letters A of Figure 4. In both Figures 4 and 5 there is little possibility that in event printing of a letter A is undertaken that magnetic flux will pass through the B character just below the A being printed, for the reason that the B character is not flush with the recording medium at this time as are the other A characters of the typewheel. However, the system of Figure 5 does reduce the leakage from the A's to the B's because half of the B's are on a different sector of the typewheel. Moreover, preferably there is a space 80 between the letter Z and the letter A of Figure 5, this space also being clearly shown in Figures 9 and 10. This prevents leakage flux from passing from A to Z or vice versa whenever one or the other of these is being printed.

The characters A, B, C, etc. on the typewheel are in the form of raised magnetic material as shown in Figures 11 and 12. Preferably the raised magnetic material has its outer face composed of raised edges so as to concentrate the flux into sharp lines. This sharpens the printing operation and thus improves the final printing operation. In other words, the upper surface (i.e., the face) of the letter A is not smooth but has a number of sharp edges or ridges projecting upwardly to thus concentrate the flux. The outer edges of these ridges move very close to the surface of the endless recording medium 101 on which the printing is temporarily recorded. Drum 101 is composed of any magnetic material known for its good recording properties. This drum remains stationary throughout a complete revolution of the typewheel 100. During the complete revolution of the typewheel 100 it is contemplated that one complete line of printing will be impressed on the drum 101. At this point, the drum 101 is stepped forward by the combination of ratchet 102 and pawl 103 so that printing may take place along another line of the drum during the next complete rotation of the typewheel 100. Following this the drum 101 is stepped forward one additional notch. As the magnetic printing proceeds and the drum 101 is stepped forward from time to time, the magnetized portion of the drum will pass into a dusting box 104 which contains a fine powder of material which will cling to the magnetized areas of the drum. Since this powder is exteremely fine, it will cling to the drum in a shape the shape the same as the magnetism which has been imprinted in the drum. The preferred details of the dusting box are more fully described and illustrated in the prior copending application of John Presper Eckert, Jr., and John C. Sims, Jr., Serial No. 221,362, filed April 17, 1951, for "Method and Apparatus for Magnetic Printing," and applicant's prior copending application, Serial No. 505,710 entitled "Dry Powder Ink Applicators," filed May 3, 1955. After the drum has rotated further, the dusted areas pass out of the dusting box 104 and move against the paper 105 which is pressed firmly against the drum 101 by the roller 106 so that the powder is transferred from the drum 101 to the paper 105 and therefore prints the desired magnetic configurations on the paper 105. Suitable powder for this purpose are known and have been described in detail in said prior copending applications. As the drum 101 rotates further, during the continuance of the printing of additional lines, the magnetized areas which have passed the roller 106 move into the field of the erasing means 107 whereupon the drum is demagnetized and thereby prepared to again move into operative relation with the typewheel 100 for an additional printing operation.

After each revolution of the typewheel 100, the switch 108 is operated so as to energize the stepping electromagnets 109 and 110 to thus step forward drum 101 and the tape drive 111. The latter moves the tape 112 into a new position wherein there are additional binary signals stored for the next horizontal line to be printed.

Figure 3:
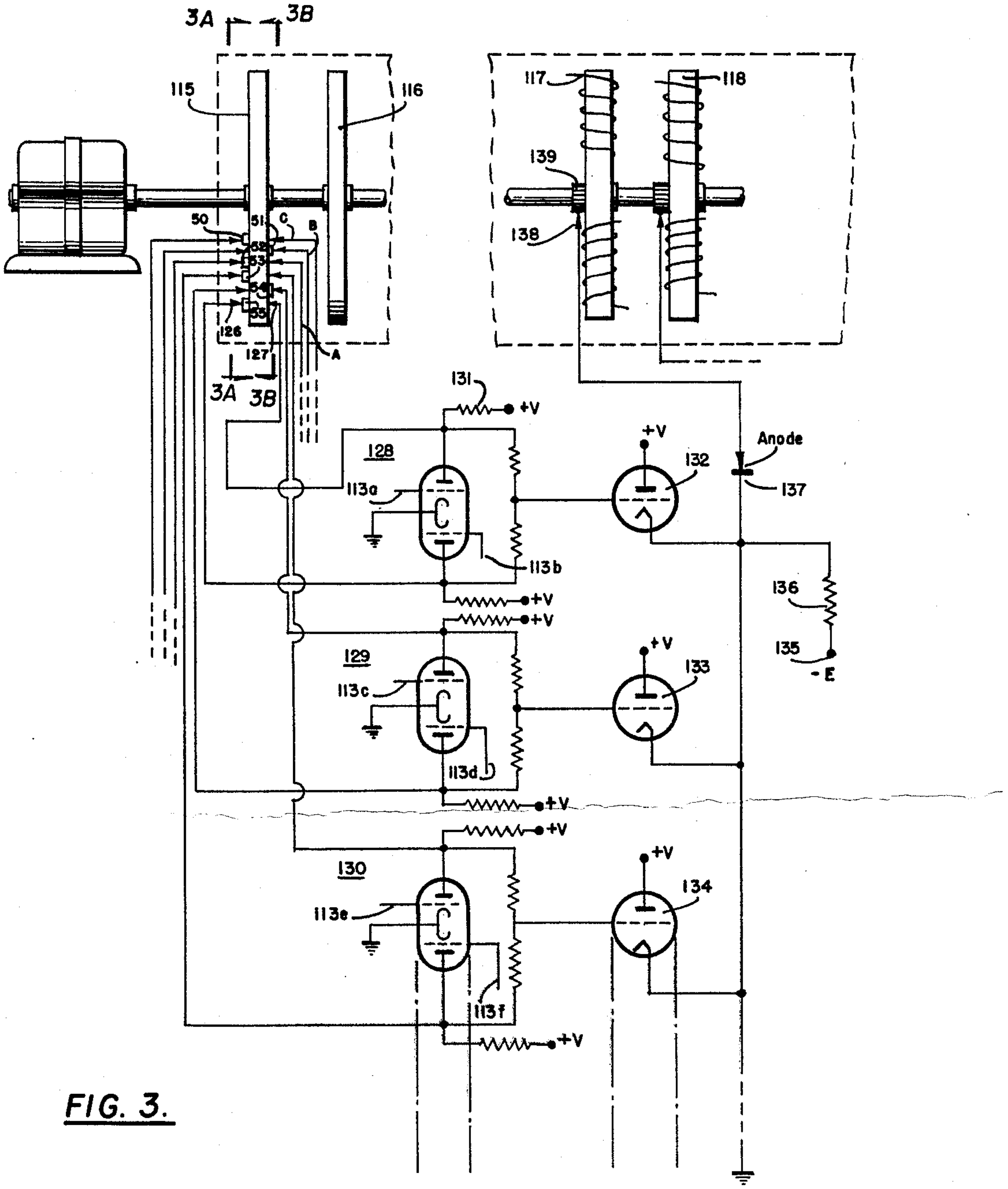
Figure 3 is a schematic diagram of certain details of the comparator.

Each time the tape 112 is stepped forward, a new group of binary signals are fed from tape reading device 113 to the comparator 114. The details of the comparator are more fully illustrated in Figure 3. There is one disc 115 for each section of the typewheel. Figure 3 shows only two such discs, 115 and 116, and only two sections of the typewheel 117 and 118. However, the interconnections between each disc and its complementary section of the typewheel are the same and therefore only one of these has been illustrated in detail. Each disc 115 has grounded contact points on both faces thereof. Any single row of contact points (considering the contacts on both sides of the disc along any one radius as a single row) form a binary single representing one letter to be printed. For example, it can be considered that the row 119A together with the row 119B of Figures 3A and 3B form the binary signal for the letter A. There are six different imaginary circles upon which contact points may be located. These different distances respectively bear reference numbers 120, 121, 122, 123, 124 and 125. The row 119 which includes contacts along row 19A of one face of the disc and along row 119B of the opposite face, has contact points in imaginary circles 120, 122, 123 and 125 on one face of the disc (see Figure 3A), and on circles 121 and 124 of the other face (see Figure 3B). It may be stated as an invariable rule that the contact along any given radius on one face of the disc are positioned at levels in which there are no contacts on the same radius of the other face of the disc. Contacts 50, 51, 52, 53, 54 and 55 respectively represent one six-digit binary number as will later appear. Moreover, there are always six contacts along any one radius of the disc, considering the contacts along that radius on both sides of the disc. There are twelve brushes, six on each side of the disc, and these six brushes are located at the six different levels 120 to 125 inclusive. Two of these brushes 126 and 127 feed a flip-flop circuit 128. The flip-flop circuits 128, 129 and 130 are three of the total of six flip-flop circuits associated with the disc 115. Each flip-flop is fed by two brushes associated with disc 115.

The tape reading device 113 produces one group of six digit binary signals for each section of the rotating typewheel 100. For example if there are 50 vertical columns to be printed, there would be fifty sections (Figure 2 showing one section) on the typewheel 100. Each section of typewheel 100 would have a complementary disc (see disc 115 for example), and each disc has six flip-flop circuits associated with it (see circuits 128, 129 and 130 for example). It follows that one of the fifty six-digit binary signals is complementary to disc 115. This particular six-digit binary signal and its relation to disc 115 is typical and will be discussed for purposes of illustration.

The signals representing the first of the six digits of the binary signal complementary to disc 115 feeds flip-flop circuit 128. The signal representing the second of these six digits feeds flip-flop 129. The signal representing the third feeds flip-flop 130, and the other three signals of the group respectively feed the other three flip-flops (not shown).

If the tape reading device employs a paper tape, it is clear that each time the tape is advanced to a new position by ratchet wheel 111, it produces a total of fifty six-digit binary signals and constantly respectively feeds them to the fifty discs (such as 115) of the comparator 114. Each of the fifty binary signals may be represented by six positions on the paper tape 112 and each digit of the six-digit number is controlled by whether or not there is a hole in the tape at the position which represents that digit.

If we now analyze the binary signals that are complementary to disc 115, it may be assumed that if there is no hole in tape 112 representative of the first digit then a positive potential will be applied to wire 113*a* while wire 113*b* will be at ground potential. If there is a hole in tape 112 representative of the first digit then the wire 113*a* will be at ground while wire 113*b* will be at a positive potential. Likewise if there is no hole in tape 112 representative of the second digit then a positive potential will be applied to wire 113*c* while wire 113*d* will stand grounded; whereas if there is a hole in tape 112 representative of the second digit wire 113*c* will stand grounded while wire 113*d* will be at a positive potential. The same relationship exists between the third to sixth digits of the binary signals and the third to sixth flip-flops 130, etc.

Assume that the flip-flop circuit 128 is in the stable state where it is being fed by a positive signal on its grid 113*a* but none on 113*b*, the upper portion of the tube is conducting and draws a current through the resistor 131 and thus lowers the upper anode of circuit 128 to ground. The lower grid 113*b* is at ground potential and no current flows through the lower portion of the tube, hence the lower anode would therefore tend to rise to the potential +V. However, whenever the disc 115 is in a position where the brush 126 is touching one of the grounded contacts on disc 115 and brush 127 is not touching any contact so that it is in effect not connected to anything, the action of flip-flop 128 is somewhat modified since the lower anode is then effectively grounded through brush 126. Hence both anodes of flip-flop 128 are in effect grounded and the grid of tube 132 is in effect grounded whereby this tube is cut off. An anode may be effectively grounded by virtue of the fact that the brush to which it is connected is at the moment resting on a grounded contact of the disc 115 or by virtue of the fact that its complementary control grid is energized. Turning now to the second flip-flop 129, the action is very much the same as in connection with the first one. In event both its anodes are effectively grounded there will be no potential on the grid of tube 133 and it will be cut off. The same relationship exists between flip-flop 130 and tube 134. There is a position on the disc 115 wherein all of the tubes 132, 133, 134, etc. are cut off. This situation occurs at only one angular position of the disc 115 and then only when the binary signal produced by the tape reading device 113 conforms to the binary signal established by the position of the contacts along the particular radius of the disc involved. When this coincidence occurs and all of the tubes 132, 133, 134, etc., are cut off, current may now flow from the negative source 135 through resistor 136, rectifier 137 and brush 138 which engages the commutator 139 of the section 117 of rotating typewheel 100. Each electromagnet of the section 117 is connected to one commutator segment of the commutator 139 and the brush 138 energizes only one such segment at a time. The position of the brush 138 is such that when the tape reading device is in proper position to produce the letter A, and the disc 115 has moved to the position where the binary signal representing the letter A is fed to the flip-flops 128, 129, 130, etc. that the current fed through the brush 138 to the commutator segment 139 then flows through the particular electromagnet which corresponds to the letter A and thereby produces a magnetic flux through that letter A and into the drum 101, thus imprinting the letter A on the drum. The same is true for all the other letters involved.

In other words the brush 138, commutator 129 and the electromagnets are so positioned that only the electromagnet which is in printing position (flush with drum 101) can be energized and it is energized only when the letter which it is adapted to print is complementary to the binary signal produced for the time being by the tape reading device 113. This letter cannot be printed at any other time than the moment the proper electromagnet is flush with drum 101 since at no other time is disc 115 in the proper position to insure that all the anodes of the flip-flops are grounded.

It is noted that printing only occurs in certain particular areas of the drum 101. In other words, irrespective of the number of times the drum 101 may rotate, and irrespective of the position of the rotating typewheel 100, there are a number of areas on the drum 101 where printing takes place and other areas where printing never takes place. Consequently, the operation may be improved by using non-magnetic material for the drum in those areas where printing never takes place and magnetic materials for those areas where printing does take place. This is illustrated in Figure 1 for a very limited area of the drum 101 by showing a few areas 140 which are composed of very good magnetic material, it being understood that there is one of these areas for each position that printing may take place and the area of the drums between them is composed of non-magnetic material. This prevents undesired magnetization of the drum and thus improves the recording.

Figure 13 is a modified form of the invention in which the rotating typewheel 141 has raised characters of magnetic material the same as is shown in Figures 11 and 12 but in this case the electromagnets are positioned in a different way. The recording drum 142 is composed of magnetic material the same as drum 101 of Figure 1. A yoke 143 passes close to the axle of typewheel 141 and passes through the center of drum 142. Mounted on the yoke 143 are a number of electromagnets 144, 145 and 146. The yoke 143 and the electromagnets 144, 145 and 146 are stationary, although the typewheel 141 and the drum 142 rotate. However, the magnetism always occurs at the proper place and the electromagnets may be selectively energized when the rotating typewheel is in the proper position to record the information on the drum 142. The dusting box 104, paper 105, roller 106 and erasing magnet 107 of Figure 1 would normally be added to Figures 13 and 14.

Figure 15 is a further modified form of the invention wherein the rotating typewheel 144 cooperates with the drum 145. Here the magnetic field is established by a series of plates 146, 147, 148, etc., there being one of these plates for each column on the typewheel. Each plate such as 146 has a coil such as 149 on it for energizing the same. When the rotating typewheel 144 is in the proper position to record the desired letter on the drum 145, the coil 149 is energized which passes flux through the desired configuration on the typewheel 144 into the drum 145. In view of the large areas between drum 145 and plate 146 and between typewheel 144 and plate 146, the flux density is so low in all places other than where recording takes place, that it can be neglected in the operation of the apparatus. The dusting box, erasing magnets and printing roller may be added to Figures 15 and 16 the same as to Figure 1.

Figures 17 and 18 show a modified form of the invention in which the recording medium is in the form of an endless tape 150. This tape passes over guide rollers 151 and 152 as well as over stationary guides 153 and 154. The electromagnet 155 is stationary and cooperates with the rotating typewheel 156. The lower guide roller 157 cooperates with the dusting box 158. Roller 159 presses the paper 160 against the endless tape 150 and in turn against the roller 157. In this form of the apparatus the endless tape is continuously rotated by driving one of the rollers 151, 152 or 157 and as it passes by the electromagnet 155, the latter is energized at the correct angular position of the rotating typewheel 156. The latter of course rotates very rapidly compared with the forward speed of the endless tape which is preferably stepped forward the same as the drum 101 is stepped forward in Figure 1. After the magnetic recording has been placed on the tape 150 by the recording head 156, the tape is dusted in the dusting box 158 and the paper 160 is printed by the roller 159.

As pointed out in connection with Figure 1, there may be limited small areas 140 composed of magnetic material while the remainder of the drum 101 is of non-magnetic material. This same principle can be carried out, although not quite as effieciently, if, as shown in Figure 14, there are alternate bands of magnetic and non-magnetic material composing the drum 142. The bands 160 are composed of magnetic material whereas the bands 161 are composed of non-magnetic material and the latter are shown speckled to distinguish them from the former.

Due to the plurality of magnetic portions or areas 140, the drum surface exhibits a screened configuration. This configuration of screened surface may be effected by a number of processes known in the art, and one such process is as follows: The drum 101 may originally comprise a soft iron drum and the said drum may then be covered by a silk screen and coated with a water-soluble coating thereby to define a plurality of squares on the drum surface corresponding to apertures in the silk screen. The drum may then be further coated with a hygroscopic lacquer and soaked in water, thereby to remove the water-soluble areas formerly placed on the drum surface and giving an overall surface having a plurality of acid-resistant areas. The drum may then be etched by an appropriate acid, thereby to effect a plurality of depressions in the drum surface intermediate the acid-resistant areas. It will be appreciated that the process to this point corresponds to one known process in the photoengraving art and many variations therein will be suggested to those skilled in the art. Subsequent to the foregoing preparation of the drum surface, the drum may be coated with a magnetic alloy such as a nickel cobalt and this alloy may be applied by a technique such as described in Patent No. 2,644,787; or appropriate magnetic materials may be applied to the etched drum surface by techniques such as vacuum deposition, or spraying. The foregoing deposition of magnetic material completely coats the drum, including the depressions formed therein, by the acid etch whereafter the drum may be machined, for instance on a centerless grinder, to remove the excess of magnetic material, giving an over-all screen surface comprising a plurality of magnetic insets in the soft iron drum, the overall screened drum surface being mechanically smooth.

I claim to have invented:

1. In combination, a typewheel rotating on an axis and having rows of type elements all parallel to the axis of rotation of said typewheel, said type elements being disposed in a plurality of spaced columns with each of said parallel rows containing a plurality of identical type elements spaced from one another along a line substantially parallel to the axis of rotation of said typewheel, there being at least two of said rows of identical type elements for each character to be printed with one of said rows having its type elements disposed in odd-numbered columns and the other of said rows having its type elements disposed in the even-numbered columns between said odd-numbered columns, means movable in a position adjacent said typewheel to receive lines of printed material therefrom, and means for selectively causing the type elements of the several rows to effect printing on said movable means including means for causing selected ones of the identical type elements of each row to effect their printing operations simultaneously as the row rotates into printing position, said odd-numbered columns all being disposed in a first sector of said typewheel, said even-numbered columns all being disposed in a second different sector of said typewheel, said first and second sectors comprising opposing sectors of said typewheel respectively.

2. The combination of claim 1 in which the type elements comprise electromagnets the faces of which have raised magnetic material in the shape of the character to be printed, said first-named means comprising a surface of magnetizable material which is closely adjacent the path of movement of said faces, and the second-named means comprising means for energizing selected electromagnets complementary to type elements that are closest to said drum whereby to effect printing.

3. In combination, means on which printing may take place, and means for effecting printing thereon comprising means rotating on an axis, said last-named means having rows of plural type elements all parallel to the said axis of rotation and disposed in spaced columns transverse to the axis of rotation, there being at least two rows of identical type elements for each character to be printed, one of said rows having its type elements in odd-numbered ones of said columns and the other of said rows having its type elements in even-numbered ones of said columns, said odd and even numbered columns being disposed in staggered relation to one another with the type elements in the odd-numbered columns being all located in a sector of the rotating means opposite the type elements in the even-numbered columns.

4. The combination of claim 3 in which the sector of said rotating means having the odd-numbered columns is distinct and spaced from the sector of said rotating means having the even-numbered columns, the spaces between the two said sectors being greater than the width of a row.

5. In combination, a magnetic printer comprising a rotating typewheel having rows of type elements all parallel to the axis of rotation of said typewheel, said type elements being located in spaced columns disposed transverse to said axis of rotation, each of said type elements comprising an electromagnet having a magnetic type face shaped according to a character to be printed, there being at least two of said rows of type elements for each character to be printed with one of said two rows having its type elements in odd-numbered columns and the other of said rows having its type elements in even-numbered columns disposed intermediate and in staggered relation to said odd-numbered columns, and means for selecting the row of each column which has the desired character to be printed, a number of the type elements in the even-numbered columns being located in one sector of the typewheel in which there are no type elements in odd-numbered columns, and a number of the type elements in the odd-numbered columns being located in another sector of the typewheel in which there are no type elements in even-numbered columns.

6. In combination, magnetic storage means, and means for placing magnetic information on said storage means comprising rotating means adjacent said storage means and having rows of magnetic type elements all parallel to the axis of rotation of said rotating means, said type elements being disposed in spaced columns transverse to said axis of rotation, half of said rows having their type elements in odd-numbered ones of said columns and the other half of said rows having their type elements in even-numbered ones of said columns, said odd and even numbered columns being disposed in staggered relation to one another with the type elements in the odd and even-numbered columns being respectively in different sectors of the said rotating means, and control means for passing flux through selected ones of the type elements in each of said rows during rotation of said rotating means.

7. The combination of claim 6 in which each of said characters to be printed has a plurality of type elements disposed in two rows, one of said rows having its type elements in odd-numbered ones of said columns and the other of said rows having its type elements in even-numbered ones of said columns, all of type characters in said two rows being identical to one another.

8. In a system of magnetic recording, means containing a number of type, and means for selectively bringing said type into recording position as well as passing magnetic flux through said type, the face of each of said type comprising a plurality of parallel raised ridges of magnetic material for delivering magnetic flux.

9. In a system of magnetic recording, a recording medium, means containing a number of type and means for selectively bringing said type into a position in recording relation to the recording medium as well as passing magnetic flux from said type when in such position to the recording medium, at least one part of one of the faces of said type comprising a plurality of parallel ridges of raised magnetic material.

10. A system of magnetic recording as defined in claim 9 wherein each part of substantially all of the faces of said type are composed of generally parallel ridges.

11. In a system of magnetic recording, a recording medium, means containing a number of type to be recorded and means for selectively bringing said type into a position in recording relation to the recording medium as well as for passing magnetic flux from said type when in such position to the recording medium, each of the faces of said type being composed of raised elements each of smaller size than the size of the desired impression and which taken as a whole form the desired impression to be recorded, whereby the flux from each small element is more concentrated than if the face of the type had been smooth.

12. In a system of magnetic printing, an endless movable storage material which is as wide as the matter to be printed, said storage material comprising a first plurality of non-magnetic sections and a second plurality of magnetic sections disposed in spaced interlaced relation to one another, means for moving said endless material along a defined path, and a recording typewheel positioned transverse to the path of motion of said endless material for magnetizing selected ones of the magnetic sections in a generally rectangular area of the said material, said rectangular area having its longer dimension transverse to the path of motion of the material, said recording typewheel having magnetic type thereon, each of the faces of said type having raised portions for concentrating magnetic flux passing therethrough.

13. In a system of magnetic printing, a rotating typewheel having rows of characters, said rows being parallel to the axis of rotation and the characters of said rows being positioned to form spaced columns, alternate ones of said columns being disposed in staggered relation to one another on distinct sectors of said typewheel, all of the characters in any one row being the same and there being at least one row for each character to be printed in each of said distinct sectors, means for rotating said typewheel, a recording drum having its periphery closely approaching that of the typewheel, the surface of said drum comprising plural magnetic and non-magnetic sections interlaced with one another, and means responsive to the information to be printed for passing magnetic flux through the recording medium and through proper characters to be printed when the latter arrive in a position closest to the recording drum thereby to record desired information in selected ones of the said magnetic sections of said drum surface.

14. In a system of magnetic printing, a rotating typewheel having parallel rows of shaped magnetic characters which consecutively rotate into recording position, each of said rows comprising a plurality of characters identical to one another with each of said characters having a ridged outer configuration for concentrating flux passing therethrough, a magnetic medium on which recording is to take place, means for moving the magnetic medium on which recording is to take place past said recording position, and means timed with the instantaneous position of the typewheel for passing flux through selected ones of said characters as they reach recording position, said last-named means including a record reading mechanism for deriving signals for controlling said application of flux.

15. In a system of magnetic recording, a rotating typewheel having rows of raised shaped characters made of magnetizable material, a recording medium comprising plural sections of magnetizable material spaced from one another by other sections of non-magnetic material, means for moving said medium and for positioning it in operative relation to the typewheel, tape reading means for establishing a binary signal for each character to be printed, and means controlled by the last-named means and responsive to the instantaneous angular position of the typewheel for applying a flux to selected ones of said raised characters when a selected row of said characters moves adjacent the recording medium thereby to record shaped magnetic gradients in selected ones of the magnetizable sections of said recording medium.

16. In a system of magnetic recording, a rotating typewheel having a plurality of magnetic characters thereon, first means responsive to rotation of said typewheel for producing different coded first signals corresponding respectively to different angular positions of the said rotating typewheel, said typewheel having different characters thereon corresponding respectively to said different coded first signals, second means for establishing coded second signals representing information to be printed, a magnetic recording surface adjacent the typewheel whereby a given character is in printing position when it is adjacent the said recording surface, and third means responsive to coincidence between the coded first and second signals of the said first and second named means for applying a magnetic flux to the selected character when the latter is in printing position.

17. A system of magnetic recording comprising a hollow rotatable cylindrical drum of magnetic material; a row of stationary electromagnets within said drum for selectively passing flux through a row of spaced spots along said drum in any position thereof; and a typewheel rotating on an axis parallel to that of said drum and having its outer surface closely adjacent to said drum; said typewheel having a column of type for each said electromagnet and positioned so that, when an electromagnet is energized, flux passes through one type of the column associated with said electromagnet; each of the faces of said type being composed of raised elements of magnetic material for magnetizing said drum according to the shape of the impression to be recorded; the raised elements of a face of said type each being of smaller size than the size of the impression to be recorded and when taken as a whole form the impression to be recorded; whereby the flux from each small element is more concentrated than if the face of the type on said typewheel were smooth.

18. A system of magnetic recording comprising a cylinder of magnetic material rotatable about its axis; a rotatable typewheel having a number of columns of magnetic type thereon; and a separate magnetic circuit for each column; each magnetic circuit including a plate of magnetic material located in the plane of the column and passing adjacent both the column and the cylinder, each plate having a coil thereon for setting up a magnetic flux between the column and the cylinder; each of the faces of said type being composed of raised elements each of smaller size than the size of the impression to be recorded and which taken as a whole form the desired impression to be recorded, whereby the flux from each small element is more concentrated than if the face of the type on said typewheel were smooth.

19. A system of magnetic recording comprising a rotatable typewheel, an adjacent stationary electromagnet, and a magnetic tape for passing between said electromagnet and said typewheel, said typewheel containing a plurality of type, each of the faces of said type being composed of raised elements each of smaller size than the size of the desired impression and which taken as a whole form the desired impression to be recorded, whereby the flux from each small element is more concentrated than if the face of the type were smooth.

20. In a magnetic system, a rotatable drum having a circumferential surface, said surface consisting of a plurality of circumferential bands spaced transversely along the length of said drum, alternate ones of said bands having a high permeability, other ones of said bands having a low permeability, and means to effect the recording of magnetic information on said high permeability bands.

21. In a magnetic printer, magnetizable means having a plurality of distinct spaced spots of high permeability material arranged in rows and columns, the areas between spots being composed of low permeability material, and printing means comprising a rotating typewheel having plural magnetic characters thereon for magnetizing selected ones of said high permeability spots according to the information to be printed.

22. In a magnetic printer, magnetizable means having distinct spaced spots of high permeability material arranged in parallel rows with the spots of the said rows forming parallel columns of spots disposed transverse to said rows, the areas between said spots being composed of low permeability material, means having separate magnetic printing heads for each of said columns, said heads being aligned with one another in a direction parallel to said rows, means for energizing selected ones of said printing heads to print selected information on one of said rows of spots, and means for thereafter moving the magnetizable means a distance equal to the spacing between adjacent rows of said spots in a direction parallel to said columns whereby said printing heads may be energized to print selected information in the next row of said spots.

23. The combination of claim 16 wherein said first means comprises a code wheel rotating in synchronism with rotation of said typewheel.

24. The combination of claim 16 wherein said third means comprises a plurality of bistable devices each of which is individually responsive to both said first and second coded signals to produce one or the other of two predetermined outputs, and means responsive to simultaneous occurrence of a preselected one of said predetermined outputs from all of said plurality of bistable devices for applying said magnetic flux to said selected character.

References Cited in the file of this patent

UNITED STATES PATENTS

| | | |
|---|---|---|
| 1,933,650 | Bascom | Nov. 7, 1933 |
| 2,397,604 | Hartley | Apr. 2, 1946 |
| 2,533,242 | Gridley | Dec. 12, 1950 |
| 2,552,156 | DeFrance | May 8, 1951 |
| 2,609,143 | Stibitz | Sept. 2, 1952 |
| 2,720,642 | Blakely | Oct. 11, 1955 |
| 2,736,770 | McNaney | Feb. 28, 1956 |
| 2,770,796 | Boer | Nov. 13, 1956 |
| 2,784,392 | Chaimowicz | Mar. 5, 1957 |
| 2,791,310 | Jones | May 7, 1957 |
| 2,797,402 | Duffey et al. | June 25, 1957 |
| 2,511,121 | Murphy | June 13, 1959 |

OTHER REFERENCES

Ferromagnetography—High Speed, G. E. Review, July 1952, pages 20–22 and 61.

Ferrography, Journal of the Franklin Institute, November 1951, pages 373–381.

Nonmechanical High-Speed Printers, Review of Input and Output Equipment Used in Computing Systems. Joint AIEE-IRE-ACM Computer Conference, March 1953, pages 113–117. (Copy in Div. 42.)